Sept. 24, 1946.  C. B. BAZZONI ET AL  2,408,029

ELECTRICAL PROSPECTING APPARATUS

Filed July 6, 1940

WITNESS:

INVENTORS
Charles B. Bazzoni
John W. Millington
BY
ATTORNEYS.

Patented Sept. 24, 1946

2,408,029

UNITED STATES PATENT OFFICE 2,408,029

ELECTRICAL PROSPECTING APPARATUS

Charles B. Bazzoni, Wallingford, Pa., and John W. Millington, Beaumont, Tex., assignors to Sperry-Sun Well Surveying Company, Philadelphia, Pa., a corporation of Delaware Application July 6, 1940, Serial No. 344,192

3 Claims. (Cl. 175—182)

This invention relates to geophysical prospecting, and more particularly, by so-called electrical coring, to the determination of the nature and boundaries of formations traversed by bore holes.

In the patent to Bazzoni and Razek No. 2,167,630, dated August 1, 1939, there is described a method and apparatus for electrical prospecting, the method involving lowering into a bore hole an apparatus arranged to propagate high frequency oscillations into the strata surrounding the apparatus. By causing the oscillation producing apparatus to be affected by the strata in its vicinity, a measurement of the electrical conditions of the apparatus will give an indication of the formations which are encountered. Instead of having the oscillation producing apparatus affected by the field it produces, a separate detecting means may be provided to record, for example, the intensity of the field in a given location in the vicinity, thereby also securing an indication of the strata through which the apparatus is passing. The various matters to be taken into account are fully described in said patent, and reference is made thereto for a more general description of the problems which arise.

The effects of various materials on high frequency currents depend upon the frequencies of these currents, inasmuch as with change of frequency different properties of the strata exert different relative effects on the electrical configuration of the system. For example, at quite low frequencies, the resistivity of a particular stratum is alone substantially responsible for effects on currents. On the other hand, at high frequencies, the dielectric constant and permeability of a stratum become increasingly important in their effects on the current. Thus by determination of the different effects observed at different frequencies, materials may be differentiated even though so far as one electrical property may be concerned they may be very similar, provided one or more of the others is different in the different materials. It is the general object of the present invention to provide an apparatus and method for the simultaneous logging of a hole at different frequencies with suitable independent determination of the responses to the different frequencies, so that proper interpretations of the results may be secured. In one modification in accordance with the invention, provision is made for recording the difference between the responses directly to secure a greater sensitivity of indication.

A further object of the invention, useful even if only one frequency is used, relates to the provision of a large exploratory coil which, nevertheless, carries currents of very high frequency.

Further objects of the invention, relating particularly to details, will be apparent from the following description, read in conjunction with the accompanying drawing, in which.

In view of the fact that the apparatus is for the purposes illustrated in said Bazzoni and Razek patent, and since a substantially similar arrangement of parts within a bore hole may be used, there are illustrated herein only such details of the invention as are necessary to understand it.

Figure 1:
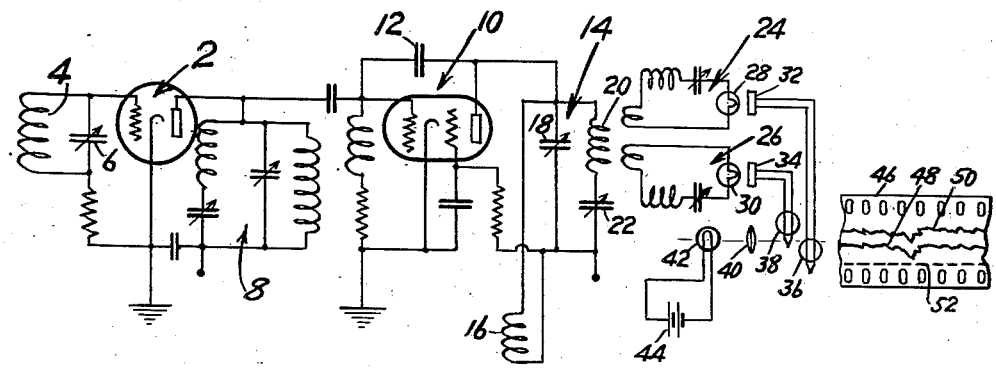
Figure 1 is a wiring diagram illustrating an embodiment of the invention.

In the apparatus of Figure 1, there is illustrated at 2 a triode in an oscillator circuit including a grid circuit composed of an inductance 4 and an adjustable condenser 6 in parallel tuned to one of the frequencies desired for logging. For the sake of simplicity in description, let it be assumed that this circuit is tuned to five megacycles. The plate circuit of the tube 2 consists of a doubly tuned circuit which may take many forms, for example, that illustrated at 8, which is resonant at both five megacycles and, for example, ten megacycles. Coupled to this first oscillator circuit is an amplifier-oscillator circuit comprising the tube 10 having a feed-back condenser 12 and a plate load circuit 14 generally similar to that indicated at 8 in being resonant at both five and ten megacycles. Owing to the feed-back arrangement and the tuned circuits, described, there will exist in the plate circuit of the tube 10 currents at both five and ten megacycles. The two tubes are used because it is generally difficult to cause one tube to oscillate reliably at different frequencies. Hence there is adopted the circuit just described, in which one tube is oscillating at one frequency and the other tube amplifies the currents at this frequency and is itself oscillating at a second frequency. While the frequencies have been specifically described as bearing a harmonic relationship to each other, that is by no means necessary, and the circuit may be so adjusted as to provide currents at quite different frequencies bearing no simple numerical relationship to each other.

While other output circuits may be adopted, that illustrated at 14 is preferred, and comprises an exploratory coil 16, which is arranged to move through a bore hole shunted by an adjustable condenser 18 and also by the series circuit consisting of an inductance 20 and another adjustable condenser 22. As in the case of the apparatus of the Bazzoni and Razek patent, the oscillator arrangement described is preferably located in a case below which there is provided the coil 16, so that transmission of high frequencies to the surface is avoided. The recording device, which will be presently described, may also be located in the casing with provision for automatic recording or, alternatively, signals may be transmitted to the surface and recording accomplished there.

Suitably coupled to the coil 20 are wave meter circuits 24 and 26 consisting in their simplest form of resonant circuits containing lamps 28 and 30. These wave meters are sharply tuned respectively to the different frequencies which are used in the apparatus, with the result that the illumination of the lamp 28 will depend upon the responses of the strata to one frequency, while the illumination of the lamp 30 will conform to the responses of the strata to the other frequency.

In recording in accordance with the arrangement of Figure 1, photocells of self-generating type indicated at 32 and 34 are arranged to respond to the illumination from the lamps 28 and 30 and so translate variations in illumination into direct currents to affect the oscillograph mirrors 36 and 38, on which are directed beams of light from a lamp 42 by means of a lens system conventionalized at 40, the lamp 42 being illuminated by a battery 44. The beams reflected from the oscillograph mirrors produce traces 48 and 50 on a sensitized film 46. If this film is located within a recording device lowered into the hole as part of the exploring apparatus, time markings 52 are preferably provided thereon as described in said Bazzoni and Razek patent. In the case of recording at the surface, the film is desirably moved in synchronism with the cable lowering the exploratory apparatus, so that distances along the length of the film will bear some proportionate relationship to the depth of the exploration. In the case of recording at the surface, the connections carrying direct current between the photocells 32 and 34 and the oscillograph mirrors are provided through the supporting cable.

As pointed out above, the two frequencies involved in this circuit may bear no harmonic relationship to each other, but generally a more stable arrangement is provided if the frequency of the second generator is one of the harmonics of the frequency of the first generator. As is usual in the case of vacuum tube oscillators, the harmonics of the main frequency in the first generator will appear simultaneously therein, and the one of these corresponding to the frequency of the second generator will lock that generator into synchronism. However, from the standpoint of the invention, the currents of different frequencies so provided in the exploratory coil are independent, and it will be understood that this term where used herein is to be construed as inclusive of arrangements in which interlocking of the two frequencies may occur, or even in which a single generator of such character is provided that the wave shapes produced are such as to have in themselves a sufficient content of one or more harmonics of a fundamental frequency to provide the different frequencies required for the logging. While the currents in their production may be dependent on each other, nevertheless, so far as the effects of the strata are concerned, they are essentially independent.

At this point, reference may be made to the special utility of the circuit comprising the exploratory coil 16 in parallel with the condenser 18 and also in parallel with the circuit branch comprising the coil 20 and second condenser 22. This circuit is resonant at the two frequencies which are used, and hence contributes to the operation previously described. It has, however, still another advantage in that the coil 16 may have a considerably larger inductance than is generally feasible for carrying a particular very high frequency that may occur in this circuit. The magnitude of the responses obtained in an exploratory circuit of this nature depends directly upon increase of frequency and increase of diameter and number of turns, i. e., the inductance of the exploratory coil. At very high frequencies, the exploratory coil, in view of the necessary capacities involved in parallel with it, including distributed capacities, can contain at most very few turns; in fact, at high frequencies only a part of a single turn may sometimes be used. With the same high frequency, however, and a resonant circuit of the type just described, the exploratory coil may be made considerably larger, since the circuit will be properly resonant to the high frequency in spite of this large size of the coil. The use of this circuit is, therefore, not confined to the utilization of two frequencies for logging purposes, and it is within the scope of the invention herein to utilize such circuit in logging with one frequency alone. It may be further remarked that when such circuit is used, the exploratory coil may be either in the position 16 or in the position 20.

The design of the illustrated circuit and its alternatives described above may follow conventional practice in the design of low power transmitters as described, for example, in "The Radio Amateurs Handbook," "The Radio Designer's Handbook" and Reich's "Principles of Electron Tubes." The tubes and circuit components may be widely varied and hence it would not be informative to enter into details herein.

In the use of two frequencies as described above in connection with Figure 1, the records produced bear a fairly close resemblance to each other, and, in analyzing a record such as that illustrated in Figure 1 and comprising the curves 48 and 50, account must be taken primarily of the differences in the two curves. Instead of producing two curves such as there illustrated, it is generally more advantageous to produce one of such curves and, in addition, a second curve representing the differences between the two. In this way, the different responses may be very substantially modified to facilitate interpretation.

Figure 2:
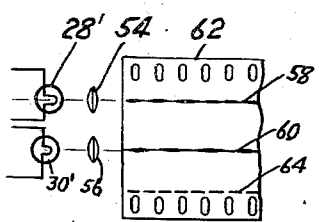
Figure 2 is a diagrammatic view illustrating an alternative recording method.
Figure 3:
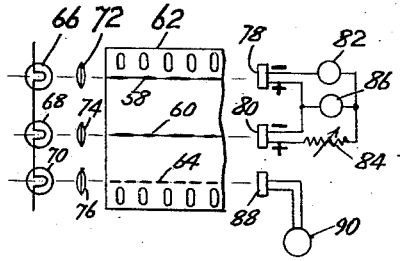
Figure 3 is a diagrammatic view illustrating the method and means for interpretation of the record produced in accordance with Figure 2.

To accomplish this result the apparatus illustrated in Figures 2 and 3 may be used.

In effecting the recording, the two wave meters corresponding to 24 and 26 are provided with lamps 28' and 30' corresponding to 28 and 30, and the variations in intensity of the lamp filaments are projected by means of lens systems 54 and 56 upon a travelling film 62 to produce, after development, variable density traces, indicated at 58 and 60. If the record is made within the exploring instrument, time markings, indicated at 64, may be simultaneously produced. If the film, on the other hand, is located at the surface and moves in synchronism with the cable carrying the logging apparatus, the time marks are not produced. In such case, of course, transmission to the surface and a suitable translating apparatus is necessary to record the variable density traces.

The film 62 may be analyzed by the apparatus of Figure 3. This comprises a plurality of lamps 66, 68 and 70, projecting beams through lens systems 72, 74 and 76 through the traces 58, 60 and 64. The beams through the traces 58 and 60 are directed upon photocells indicated diagrammatically at 78 and 80, connected in a circuit as illustrated. Meters 82 and 86 of recording type involving, if desired, suitable amplification, are connected in the circuit as shown, which is also provided with a variable resistance 84 for balancing purposes. It will be evident that with this circuit, while the meter 82 responds to the trace 58, at least primarily, the meter 86 will respond to the differences in the traces, thereby providing a sensitive indication of this difference, which is of primary significance when taken in conjunction with the amplitudes of one of the traces. The timing trace 64 may be simultaneously scanned by means of a photocell 88 connected to a recording meter 90 which may produce a time record on the same travelling record sheet. It will be evident that various electrical details may be embodied in the system just described, along the lines, for example, of the disclosure of the application of Bazzoni and Razek, Serial No. 222,610, filed August 2, 1938, now Patent 2,222,136, issued November 19, 1940. If recording is done at the surface, the differential record may be made directly without going through the intermediate stage of making a record such as 62; e. g. the photocells 32 and 34 may be connected in a circuit such as that involving cells 78 and 80.

What we claim and desire to protect by Letters Patent is:

1. Means for determining the location and character of strata penetrated by a bore hole comprising an exploratory coil movable along said bore hole, a circuit including said coil, a condenser in parallel therewith, and also in parallel therewith a circuit branch including a second coil and second condenser in series, and means for establishing through said circuit and exploratory coil in the strata adjacent the bore hole a high frequency alternating current.

2. Means for determining the location and character of strata penetrated by a bore hole comprising a circuit including a coil, a condenser in parallel with the coil, and also in parallel therewith a circuit branch including a second coil and second condenser in series, one of said coils being an exploratory coil movable along said bore hole, and means for establishing through said circuit and exploratory coil in the strata adjacent the bore hole a high frequency alternating current.

3. Means for determining the location and character of strata penetrated by a bore hole comprising a circuit including a coil, a condenser in parallel with the coil, and also in parallel therewith a circuit branch including a second coil and second condenser in series, one of said coils being an exploratory coil movable along said bore hole, and means for establishing through said circuit and exploratory coil in the strata adjacent the bore hole a high frequency alternating current to which said circuit is substantially resonant.

CHARLES B. BAZZONI.
JOHN W. MILLINGTON.